US005174252A

United States Patent [19]

Binversie et al.

[11] Patent Number: 5,174,252

[45] Date of Patent: Dec. 29, 1992

[54] EXHAUST MANIFOLD EXPANSION SLOT FOR INTERNAL COMBUSTION MOTOR

[75] Inventors: Gregory J. Binversie, Grayslake, Ill.; Frederick J. Debettignies, Kenosha, Wis.; Charles F. Erbach, Gurnee, Ill.

[73] Assignee: Outboard Marine Corporation, Waukegan, Ill.

[21] Appl. No.: 829,411

[22] Filed: Feb. 3, 1992

[51] Int. Cl.[5] ........................ F02M 25/00; B23P 13/00

[52] U.S. Cl. ........................ 123/65 PE; 123/65 EM; 123/175 R; 60/323; 60/272; 29/886.06

[58] Field of Search ............... 123/193.2, 193.3, 193.4, 123/41.84, 65 PE, 65 EM, 195 R; 29/888.06; 60/323, 272, 282

[56] References Cited

U.S. PATENT DOCUMENTS

| | | | |
|---|---|---|---|
| 4,079,588 | 3/1978 | Yoshimura et al. | 60/323 |
| 4,117,674 | 10/1978 | Tadokoro | 60/282 |
| 4,184,462 | 1/1980 | Hale . | |
| 4,187,809 | 2/1980 | Lanpheer et al. . | |
| 4,337,734 | 7/1982 | Iio | 123/65 PE |
| 4,373,475 | 2/1983 | Kirk . | |
| 4,401,061 | 8/1983 | Matsushita et al. | 123/41.84 |
| 4,559,908 | 12/1985 | Flaig et al. . | |
| 5,134,976 | 8/1992 | Towner et al. | 123/65 PE |

*Primary Examiner*—E. Rollins Cross
*Assistant Examiner*—M. Macy
*Attorney, Agent, or Firm*—Welsh & Katz, Ltd.

[57] ABSTRACT

A multiple cylinder internal combustion cylinder block having a cast exhaust manifold means integrally cast with the block is disclosed. The manifold means includes manifold port portions that communicate with the cylinder bores, and an expansion slot is provided in the manifold port portions adjacent the cylindrical bores to relieve stress that tends to distort the cylindrical bores of the block.

15 Claims, 1 Drawing Sheet

EXHAUST MANIFOLD EXPANSION SLOT FOR INTERNAL COMBUSTION MOTOR

The present invention generally relates to internal combustion motors and more particularly relates to cylinder blocks for such motors which have an integrally formed exhaust manifold.

The use of the lost foam casting process for making cylinder or motor blocks has resulted in significant improvements in manufacturing costs for such cylinder blocks, in addition to other advantages. The use of such a lost foam casting process in the manufacture of multi-cylinder V-block two stroke internal combustion motors, such as outboard motors is particularly advantageous. The process lends itself to casting other motor components to the cylinder block that had previously been separately cast and then assembled. One of such components is an exhaust manifold which can be integrally cast with the cylinder block using the lost foam process.

It has been found that when the exhaust manifold is integrally cast with the cylinder block, there is significant load or bending moment placed on the cylinder walls by the exhaust manifold when the motor is operating under running conditions. This is due to the hot exhaust gases that are produced during operation of the motor heating the exhaust manifold to a greater extent than the cylinder walls and producing an uneven temperature expansion of the manifold relative to the cylinders. Such uneven temperature expansion creates a load or bending moment that has a tendency to deform the cylindrical shape of the cylinder bores. In the extreme, such deformation of the cylindrical bores can greatly reduce the useful life of the pistons within the motor and can even result in freezing of the pistons in the cylindrical bore and substantial damage to the motor.

While care in the design of engine blocks is taken to provide adequately located and sized cooling passages in which cooling fluid can circulate, the high operating temperatures of high powered motors often does not fully prevent such deformation of the cylindrical bores.

Accordingly, it is an object of the present invention to provide a cylinder block with an integrally formed exhaust manifold means which has a construction which effectively decouples the heat caused load or bending moment of the exhaust manifold means from the cylindrical bores, which substantially reduces the deformation of the cylinder bores which can damage the motor.

Another object of the present invention is to provide such a cast cylinder block with an integral exhaust manifold wherein an expansion slot is provided on the inside surface of the manifold wall adjacent each of the cylinder walls of the block.

These and other objects will become apparent upon reading the following detailed description, in conjunction with the attached drawings, in which:

FIG. 1 is an end view of a portion of a cylinder block, showing an exhaust manifold means in phantom; and FIG. 2 is an enlarged cross-section of a portion of the cylinder block shown in FIG. 1, and is taken generally along the line 2—2 thereof.

DETAILED DESCRIPTION

Broadly stated, the present invention is directed to a cast cylinder block having an integrally formed exhaust manifold wherein an expansion slot or recess is provided in the interior wall of the portion of the exhaust manifold that communicates with each of the cylinder bores. The expansion slot or recess is for the purpose of reducing stress caused by the heated exhaust manifold from being applied to the cylinder walls which can distort the cylinder bores.

While the present invention is particularly suited for use in multiple cylinder V-block two stroke internal combustion motors, such as outboard motors, it is adapted for use with virtually any other internal combustion motor which may use the lost foam manufacturing process or some other process which permits integrally casting the cylinder block with an exhaust manifold means. The invention effectively isolates or decouples any bending or twisting of the exhaust manifold produced by heat expansion of the exhaust manifold from being applied to the cylinder walls of the cylinders in which the pistons are located.

Figure 1:
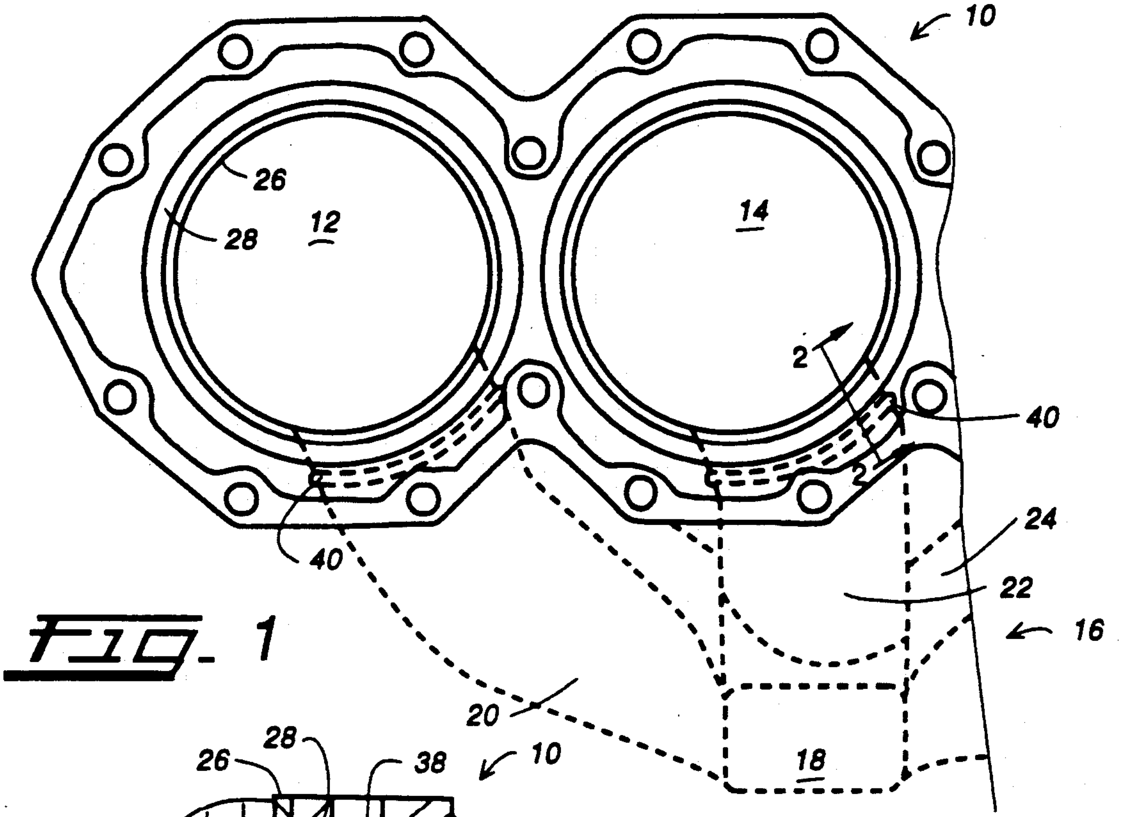
Figure 2:
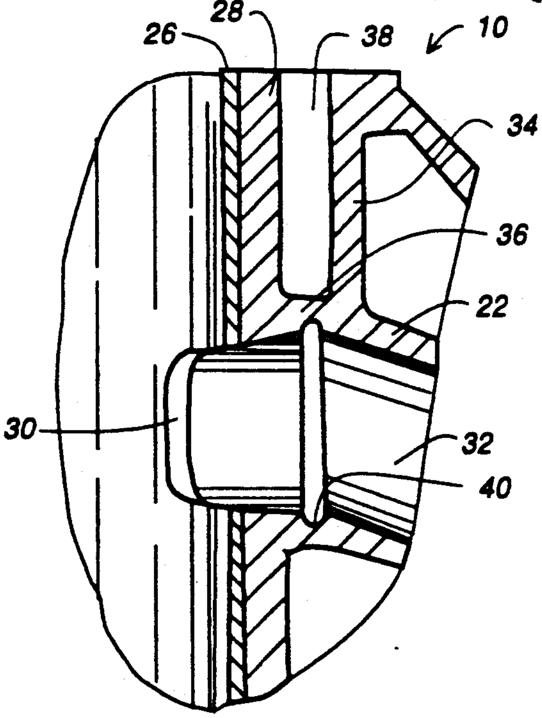

Turning now to the drawings, and referring to FIGS. 1 and 2, a cylinder block indicated generally at 10 is shown, and it is of the type which has multiple cylindrical bores 12 and 14 illustrated in which pistons of the motor are located. The cylinder block 10 also has an integrally formed exhaust manifold means indicated generally at 16 and shown in phantom, with the exhaust manifold means having a common outlet 18 and manifold port portions 20, 22 and 24 which extend to three separate cylinders, with two of the cylindrical bores 12 and 14 being shown.

While not a part of the present invention, it should be understood that each of the cylindrical bores such as the bores 12 and 14 that are illustrated have a steel cylindrical sleeve 26 that is placed in the bore before the block is cast and during the casting process a cast cylinder wall 28 is formed and it is bonded to the steel sleeve 26 during the casting operation. The casting of the block 10 may be made of various types of metal, but it is preferably an aluminum alloy. Referring to FIG. 2, the sleeve 26 includes an opening 30 which communicates with the exhaust manifold such as the manifold port portion 22. The port portion 22 has a wall of predetermined thickness and an internal port 32, which is preferably generally rectangularly shaped, but having curved corner surfaces. It should also be understood that the casting 10 has an exterior wall such as at 34 with a bridging portion 36 that extends between the exterior wall 32 and the interior cylinder wall 28 and which forms inner end portion of the exhaust manifold port portion 22 as shown in FIG. 2. Many of the areas between the cylinder walls 28 and external wall 34, such as the area 38, define passages through which cooling fluid, such as water, can pass for the purpose of cooling the cylinder walls 28.

In accordance with an important aspect of the present invention, the exhaust gases pass through the opening 30 into the inside of the port portion 32 and as can readily be appreciated, these exhaust gases are extremely hot which quickly heats up the exhaust manifold port portion walls 22 causing expansion of the walls. Because they are connected to the cylinder wall 28 via the transition section 36, considerable stress may be applied to the cylinder wall 28 and to the sleeve 26, which has a tendency to distort them. If the distortion is extreme, the cylindrical shape of the sleeve 26 may be conformed which causes uneven and rapid wear of the pistons located within them and can even freeze up the piston and severely damage the motor.

The present invention has an annular recess or slot 40 that is located in each of the exhaust manifold port portions such as the port portion 22 shown in FIG. 2 and this slot 40 effectively reduces the wall thickness in the area of the bridging portion 36 and isolates or decouples bending and twisting stresses from the port portion 22 being applied to the cast cylinder wall 28. The slot 40 preferably extends around the entire periphery of the inside surface of the port portion 22 as well as the others and it also preferably has a semi-circular cross-section as shown.

From the foregoing, it should be understood that a cylinder block having an integrally cast exhaust manifold means which incorporates the expansion slot or recess that has been shown and described represents a significant improvement over past designs which did not incorporate the expansion slot. The present invention effectively substantially reduces the distortion of the shape of the cylindrical bore of the motor that can be caused by stresses produced from thermal expansion during operation of the motor.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A multiple cylinder block of the type which is used in marine and other internal combustion motors, said cylinder block comprising:

a unitary casting in which at least two cylindrically shaped cylinder bores are provided, in which pistons are adapted to be located with the casting having cast cylinder walls around the bores and outer walls spaced from said cast cylinder walls;

said casting having a hollow exhaust manifold means with a manifold port portion associated with each cylinder bore, said manifold means being adapted to exhaust gases from said cylinders that are produced during operation of the motor;

said casting having a recess extending around substantially the entire periphery of the inside of each said manifold port portion associated with each cylinder bore, each said recess being located between the cast cylinder wall and the outer wall of said casting.

2. A block as defined in claim 1 wherein each said recess has a generally semicircular shape and extends completely around the inside surface of each said manifold port portion.

3. A block as defined in claim 1 wherein said casting is made of an aluminum alloy, each of said cylinder bores having an internal cylindrically shaped steel insert cast within said cast cylinder wall, said cast cylinder walls having a generally predetermined minimum thickness, said casting having an outer wall spaced from said cylinder walls at least in the immediate vicinity of each of said manifold port portions, with the spaces defining passages adapted for circulation of cooling fluid therethrough.

4. A block as defined in claim 3 wherein each said recess is located in said manifold port portion generally between said cast cylinder bore and said outer wall of said casting.

5. A block as defined in claim 4 wherein said manifold port portions join with one another and are thereby adapted to combine the exhaust gases from several cylinder bores.

6. A block as defined in claim 1 wherein the cross sectional shape of the interior of each of said manifold port portions is generally rectangular with curved corners.

7. A multiple cylinder motor block for an internal combustion motor, said cylinder block comprising:

a unitary casting having at least two cylindrically shaped cylinder bores in which reciprocating motor pistons are adapted to be located, with the casting having cast cylinder walls around the bores and outer walls spaced from said cast cylinder walls, the spaces between the cast cylinder walls and the outer walls defining passages in which cooling fluid can pass for cooling the motor during operation;

said casting having a hollow exhaust manifold means with a manifold portion having an internal exhaust passage associated with each cylinder bore, said manifold means being adapted to exhaust gases from said cylinders that are produced during operation of the motor;

said casting having a recessed slot extending around substantially the entire periphery of the inside of each said manifold port portion associated with each cylinder bore, each said recessed slot being located between the cast cylinder wall and the outer wall of said casting.

8. A block as defined in claim 7 wherein each said recessed slot has a generally semicircular shape and extends completely around the inside surface of each said manifold port portion.

9. A block as defined in claim 7 wherein said casting is made of an aluminum alloy, each of said cylinder bores having an internal cylindrically shaped steel insert cast within each said cast cylinder wall, said cast cylinder walls having a generally predetermined minimum thickness.

10. A block as defined in claim 4 wherein said manifold port portions join with one another and are thereby adapted to combine the exhaust gases from several cylinder bores.

11. A block as defined in claim 7 wherein the cross sectional shape of the interior of each of said manifold port portions is generally rectangular with curved corners.

12. A multiple cylinder motor block for an internal combustion motor, said motor block comprising:

a unitary casting having a plurality of cylindrically shaped cylinder bores in which reciprocating motor pistons are adapted to be located, with the casting having cast cylinder walls around the bores and outer walls spaced from said cast cylinder walls, the spaces between the cast cylinder walls and the outer walls defining passages in which cooling fluid can pass for cooling the motor during operation;

said casting having at least one hollow exhaust manifold means with a manifold portion having an internal exhaust passage associated with each cylinder bore, said manifold means having at least one outlet portion adapted to exhaust gases from said cylinders that are produced during operation of the motor, the manifold portions associated with at least two cylinder bores being in communication with one another and with said outlet portion;

said casting having an expansion slot extending around substantially the entire periphery of the inside of each said manifold port portion associated with each cylinder bore, each said recessed slot being located between the cast cylinder wall and the outer wall of said casting and being adapted to relieve stress on said cast cylinder walls caused by heat expansion of said manifold port portions on the side of said expansion slot located away from said cylinder bore.

13. A block as defined in claim 12 wherein said casting is made of an aluminum alloy, each of said cylinder bores having an internal cylindrically shaped steel insert cast within each said cast cylinder wall, said cast cylinder walls having a generally predetermined minimum thickness.

14. A block as defined in claim 12 wherein the cross sectional shape of the interior of each of said manifold port portions is generally rectangular with curved corners.

15. A block as defined in claim 12 wherein each said recessed slot has a generally semicircular shape and extends completely around the inside surface of each said manifold port portion.

* * * * *